April 13, 1965 D. J. KLEIN 3,177,850
AUTOMATIC FEEDER
Filed Oct. 4, 1963

INVENTOR
DIETRICH J. KLEIN

BY Watson, Cole, Grindle & Watson
ATTORNEY

United States Patent Office 3,177,850
Patented Apr. 13, 1965

3,177,850
AUTOMATIC FEEDER
Dietrich J. Klein, 1407 Holly Road, Charlottesville, Va.
Filed Oct. 4, 1963, Ser. No. 313,933
1 Claim. (Cl. 119—51.11)

This invention relates to automatic feeders for fish, birds, turtles or the like which is adapted for dispensing food automatically periodically.

In order to appreciate important functional features of an automatic feeder, an embodiment is described specificaly for feeding fish in an aquarium. Thus, consideration of the requirements of the fish and the state of the art of aquariums is helpful. To maintain fish in a healthy condition they must not be overfed. Neither should they be underfed and when the fish are small, such as guppies, the amount of feed must be gaged with precision. Furthermore, if mixed species and sizes of fish are maintained, the feeding must be accomplished in a single cyclic discharge, rather than continuously, to permit the weaker fish to get their share.

Also, it is important that feeding into an aquarium should be done without disrupting the cover. Thus, a proper feeder must be constructed to sit on the edge of the aquarium and extend only slightly into the tank, otherwise the cover need be modified to permit the feeder to be used, or otherwise the aquarium environment which is necessary to maintain healthy fish is disturbed by removing or displacing the cover.

Automatic feeding devices are known in the prior art, which have not solved the above problems, and which are not really cleaned or simply filled. Automatic mechanisms of the prior art have in some cases failed to operate reliably because finely pulverized fish food tends to clog and bind precision mechanisms, and thus produce either unmetered quantities or failure to dispense the food properly at the required cycles. Construction of precision parts has also been very expensive and out of the reach of many potential users.

Accordingly, it is an object of this invention to provide an improved and reliable feeder with simple, non-precision construction techniques.

It is another object of this invention to produce a self-cleaning automatically operated cyclic feeder.

A further object of the invention is to provide precisely metered quantities of animal food on a periodic basis with a simplified device.

Therefore, in accordance with the invention, an automatic fish feeder is driven from a synchronous motor which serves also to time periodic discharges by means of a cam having at least two different cam surface selections for providing distinctive drive cycles. A food reservoir is mounted for feeding a discharge mechanism in the form of a pivoted gate member. This receives a charge and then dispenses it when the cam surface reaches the periodic feeding time programmed. The pivoted dispenser includes a storage compartment for holding a single feeding of the capacity precisely metered by an adjustable screw which establishes the compartment volume. This feeder mechanism is so constructed that a mounting bracket holds the entire assembly so that the discharge can be made into the aquarium without significant interference with a glass cover.

The invention, together with further objects and features, may be understood from the following more detailed description which refers to the accompanying drawings, wherein.

Figure 1:
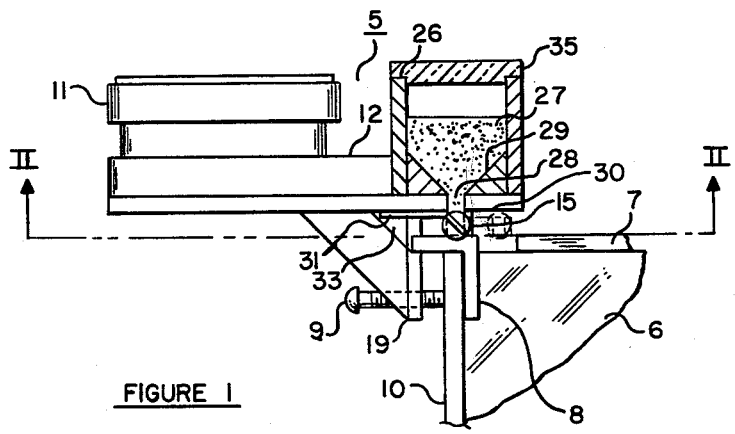
FIGURE 1 is an elevation view, partly in section, of a fish feeder dispenser embodiment of the invention mounted on the edge of an aquarium.

It is significant therefore, as shown by FIGURE 1, that the fish feed dispenser 5 be mounted on the edge of an aquarium 6 so that food may be dropped without significantly disturbing the placement of the glass cover 7. Thus, the flange 8 and screw 9 hold the dispenser on the top rim of the glass side 10 of the aquarium 6. The screw 9 is affixed to a bracket 19 which extends from the support upon which motor 11 is mounted.

Synchronous clock motor 11 has a gear train 12 which is coupled with drive shaft 13 to rotate cam 14 for providing accurately timed feed cycles. The cam 14 is reversible so that it may provide say one feeding a day in one position 16 as the cam 14 mounted on shaft 13 is shown engaging cam rider 15. If reversed or turned over the cam 14 may provide two feedings in the double slots including position 16 with another cam surface position 18.

Figure 2:
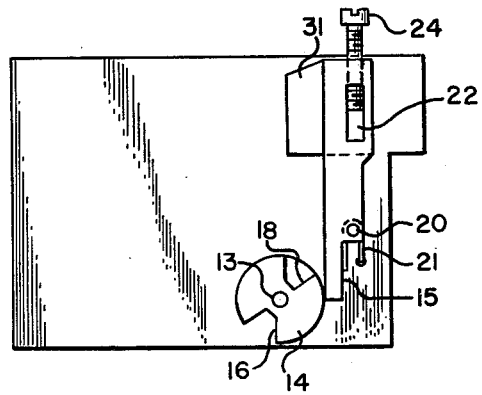
FIGURE 2 is a bottom view of the dispenser taken along lines II—II with the mounting bracket assembly omitted.
Figure 3:
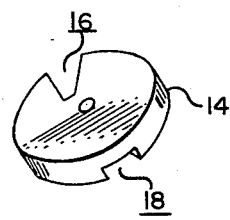
FIGURE 3 is a perspective view of a timing cam used in accordance with the teachings of the invention.

Note the preferred shaping of the cam surfaces, so that if the cam 14 rotates clockwise (as shown in FIGURE 2), the end of cam rider gate member 15 pivoted about shaft 20, quickly passes the brink at the leading surface and is forced against the slanted trailing surface by the spring 21. This action is important in jarring the food out of the precision measured compartment 22 into the aquarium to drop with a recognizable signal splash notifying the fish of the presence of food. Also, this provides an instantaneous feeding so that even small and weak fish will get their portion, which would not be so with a gradual feeding where the bigger fish could hog the supply.

Note that by the simple expedient of using screw 24 to enter the measuring compartment 22, the amount of food metered out can be precisely gaged. Thus, it is easy to adjust for new fish or fewer fish without being limited to incremental compromise amounts. This mechanism as may be seen from the operation, is not only simple but provides a much better measurement of each feeding amount. Should a multiple compartment device be used with premeasured quantities, an auxiliary and hard to manipulate measuring device would be necessary and any food sticking to the compartment would alter the measurement. Thus, for small amounts of food the present device is far superior in precision metering. Note also that the feed of the finely pulverized powder from reservoir 26 is aided by the snap action of cam 14 which serves to shake down and settle the remaining food 27 into position near the feed aperture 28 about the chamfered bottom slopes 29 to avoid the presence of voids. The reservoir 26 is provided with a transparent dust cover 35 formed from clear plastic for example. This permits viewing of the supply of food 27, without removing the cover.

In the dispensing action pivoted gate member 15 reciprocally moves by sliding snugly back and forth between an upper surface plate 30 defined by the lower surface of reservoir 26, and a lower fixed position mounting plate comprising the upper surface of flange bracket 8. This confines the change of food in compartment 22 between the two adjacent plates 8–30, while being loaded and awaiting the snap-action dispensing motion. When the gate member 15 is pivoted over the aquarium edge 10 from the receiving position illustrated, to dispense its food charge from compartment 22 (as shown in dispensing position in the phantom view of FIGURE 1), an upper closure plate 31 affixed to gate member 15 seals the reservoir aperture 28.

This structure is important in providing a self-cleaning action and permitting relatively non-precision construction of the movable mechanisms and confining plates. Thus, any tendency for food to filter in between plates 8 and 30 to cake and clog the mechanism is counteracted by a scraping and cleaning cycle automatically provided by the thin longitudinal configuration of gate member 15, which serves on the return cycle to scrape plate 8 and remove any food particles filtering down from the reservoir or escaping from the compartment 22 by pushing them out into the passageway 33. Thus, the structure is self-cleaning by the combined shakedown and scraping actions afforded, so that the finely pulverized food particles are all dispensed and fed properly and do not stick or accumulate to clog the moving mechanisms.

Since the gate member 15 need only venture slightly over the water in aquarium 6 when in dispensing position, the glass cover 7 need be only slightly moved back to permit feeding. Thus, significant environmental changes are not introduced, and there is no need to custom shape the cover to fit the feeder. Also, the feeder is removable without exposing a cover aperture, which otherwise would be necessary.

Therefore, the present invention provides an improved self-cleaning automatic fish feeder which meters out the exact feeding volume with precision, having those novel features defined with particularity in the following claim:

An auomatic fish feeder dispenser comprising in combination, a synchronous motor timing and driving device having a shaft, a reversible cam on the shaft for selectively providing in timed relationship on respective one of the two reversible positions different cam surfaces for distinctive drive cycles, a food reservoir having a lower surface mounted for gravity feed of pulverized fish food through a feed aperture therein nonmovingly fixed to a mounting bracket, a pivoted gate member of longitudinal shape cooperating with the cam surface and having a single compartment registering with the feed aperture to receive a charge of the food when pivoted in one cam position and moving into a position over the water in an aquarium tank to dispense said charge therein when pivoted in a further cam position, a lower solid flat mounting plate for confining the charge of food in the gate member until it moves out over the tank, and an upper closure plate affixed to the gate member and extending the upper surface for movement therewith to seal the aperture in the reservoir during the dispensing motion cycle, a through passageway snugly fitting the gate member between the lower mounting plate and the lower surface of the food reservoir to thereby permit the gate to reciprocate in the passageway thus pushing aside and cleaning any food which filters into the dispensing mechanism, thereby preventing clogging or binding, a mount for holding the dispenser on the edge of an aquarium so that the gate is at the edge and extends only slightly over the aquarium during the dispensing cycle thereby not significantly interfering with the position of a cover on the aquarium, and a continuously variable screw communicating with said compartment with the screw body entering and partially filling the compartment to gage the amount of food to be dispensed, whereby precision adjustments of food quantity may be made as fish are added or subtracted from the aquarium.

References Cited by the Examiner
UNITED STATES PATENTS

| | | | |
|---|---|---|---|
| 2,161,190 | 6/39 | Paull | 222—241 |
| 2,785,831 | 3/57 | Smolin | 119—5 |
| 2,800,256 | 7/57 | Di Nuzzo | 119—51 |
| 2,865,447 | 12/58 | Kaufman | 119—51.11 |

SAMUEL KOREN, *Primary Examiner.*

HUGH R. CHAMBLEE, *Examiner.*